US006690849B1

(12) United States Patent
Dadap, Jr. et al.

(10) Patent No.: US 6,690,849 B1
(45) Date of Patent: Feb. 10, 2004

(54) OPTICAL SWITCH HAVING MEMS ARRAY WITH REDUCED OPTICAL LOSS

(75) Inventors: Jerry I. Dadap, Jr., Red Bank, NJ (US); Nicolas H. Bonadeo, Aberdeen, NJ (US); Chauhan Daniel Lee, Middletown, NJ (US); Keren Bergman, Princeton, NJ (US); Igal Brener, Westfield, NJ (US); David R. Peale, Tinton Falls, NJ (US); Kophu Chiang, North Andover, MA (US)

(73) Assignee: Tellium, Inc., Oceanport, NJ (US)

( * ) Notice: Subject to any disclaimer, the term of this patent is extended or adjusted under 35 U.S.C. 154(b) by 52 days.

(21) Appl. No.: 09/754,260

(22) Filed: Jan. 5, 2001

(51) Int. Cl.$^7$ .............................. G02B 6/35; G02B 26/08
(52) U.S. Cl. ........................................... 385/18; 385/17
(58) Field of Search ............................. 385/16–20, 25, 385/31; 359/223, 224

(56) References Cited

U.S. PATENT DOCUMENTS

| 6,097,860 A | 8/2000 | Laor | ........................... 385/17 |
| 6,253,001 B1 * | 6/2001 | Hoen | ........................... 385/17 |
| 6,466,356 B1 * | 10/2002 | Peeters et al. | ............... 359/291 |

FOREIGN PATENT DOCUMENTS

| WO | WO 99/66354 | 12/1999 |

OTHER PUBLICATIONS

L. Y. Lin et al., "Free–Space Micromachined Optical Switches with Submillisecond Switching Time for Large–Scale Optical Crossconnects", IEEE Photonics Technology Letters, *IEEE Lasers and Electro–Optics Society*, Apr. 1998, vol. 10 No. 4, pp. 525–527.

* cited by examiner

Primary Examiner—Hemang Sanghavi
Assistant Examiner—O. Rojas
(74) Attorney, Agent, or Firm—Jeffery J. Brosemer (57) ABSTRACT

An optical switch includes a plurality of first optical fibers, a plurality of second optical fibers, a first MEMS array, and a second MEMS array. The first MEMS array is optically coupled with the first optical fibers to receive optical signals from the first optical fibers and to direct the optical signals, wherein the first MEMS array defines a first array incidence angle between a normal direction to the first MEMS array and a direction of the received optical signals. The second MEMS array is optically coupled with the first MEMS array to receive the directed optical signals and to re-direct the directed optical signals with the second optical fibers wherein the second MEMS array defines a second array incidence angle between a normal direction to second MEMS array and a direction of the re-directed optical signals. The configuration of the components is provided to provide reduced optical losses.

12 Claims, 12 Drawing Sheets

FIG. 11B

OPTICAL SWITCH HAVING MEMS ARRAY WITH REDUCED OPTICAL LOSS

BACKGROUND OF THE INVENTION

1. Field of the Invention

The present invention relates to an optical network, and more particularly, to an optical network having a MEMS switching system.

2. Discussion of the Related Art

In recent years, internet usage and other computer communications modes have become widespread. Moreover, audio and video applications that are becoming increasingly popular require large amounts of information (bandwidth) to be transferred. As a result, demands on the bandwidth supported by communications systems have skyrocketed. Accordingly, optical communication systems have become increasingly important to fulfill such needs.

Such optical communications systems are capable of rapidly transferring large volumes of information by converting electrical signals into light signals and transmitting the light through optical fibers. The optical fibers form a network of optical paths between different geographic locations (e.g., different metropolitan areas). To route the information between the different locations, the information is switched between different optical paths. Conventionally, the information is switched by converting the optical signals into electrical signals, switching the electrical signals, and re-transmitting the signals onto the desired optical path. Of course, the term "switch" is intended include optical cross-connects or other suitable elements.

With advances in optical communications technology, optical switches (such as MEMS switches) are being developed to provide large switching fabrics that operate in the optical domain and can switch more information faster than electrical switches. An example of such an optical switch is disclosed by L. Y. Lin et al. "Free-Space Micromachined Optical Switches with Submillisecond Switching Time for Large-Scale Optical Crossconnects," *IEEE Photonics Technology Letters*, Vol. 10, No. 4, pp. 525–527, 1998 (which is hereby incorporated by reference). However, it is desired that MEMS based optical switches operate accurately and efficiently with low loss and high switching speeds. If optical signals are subject to sufficiently great optical losses, the optical signals can no longer be reliably detected over noise and/or background effects. Thus, the reduction of optical losses serves to maintain signal integrity.

SUMMARY OF THE INVENTION

Accordingly, the present invention is directed to an optical switch that substantially obviates one or more of the problems due to limitations and disadvantages of the related art.

An object of the present invention is to provide an optical switch that provides reduced optical loss.

Another object of the present invention is to provide an optical switch that is compact.

Another object of the present invention is to provide an optical switch that is easy to operate and manufacture with a low cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an optical switch includes a plurality of first optical fiber, a plurality of second optical fibers, a first MEMS array, and a second MEMS array. The first MEMS array is optically coupled with the first optical fibers to receive optical signals from the first optical fibers and to direct the optical signals, wherein the first MEMS array defines a first array incidence angle between a normal direction to the first MEMS array and a direction of the received optical signals. The second MEMS array is optically coupled with the first MEMS array to receive the directed optical signals and to re-direct the directed optical signals into the second optical fibers wherein the second MEMS array defines a second array incidence angle between a normal direction to second MEMS array and a direction of the re-directed optical signals. The configuration of the components is provided to provide reduced optical losses.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
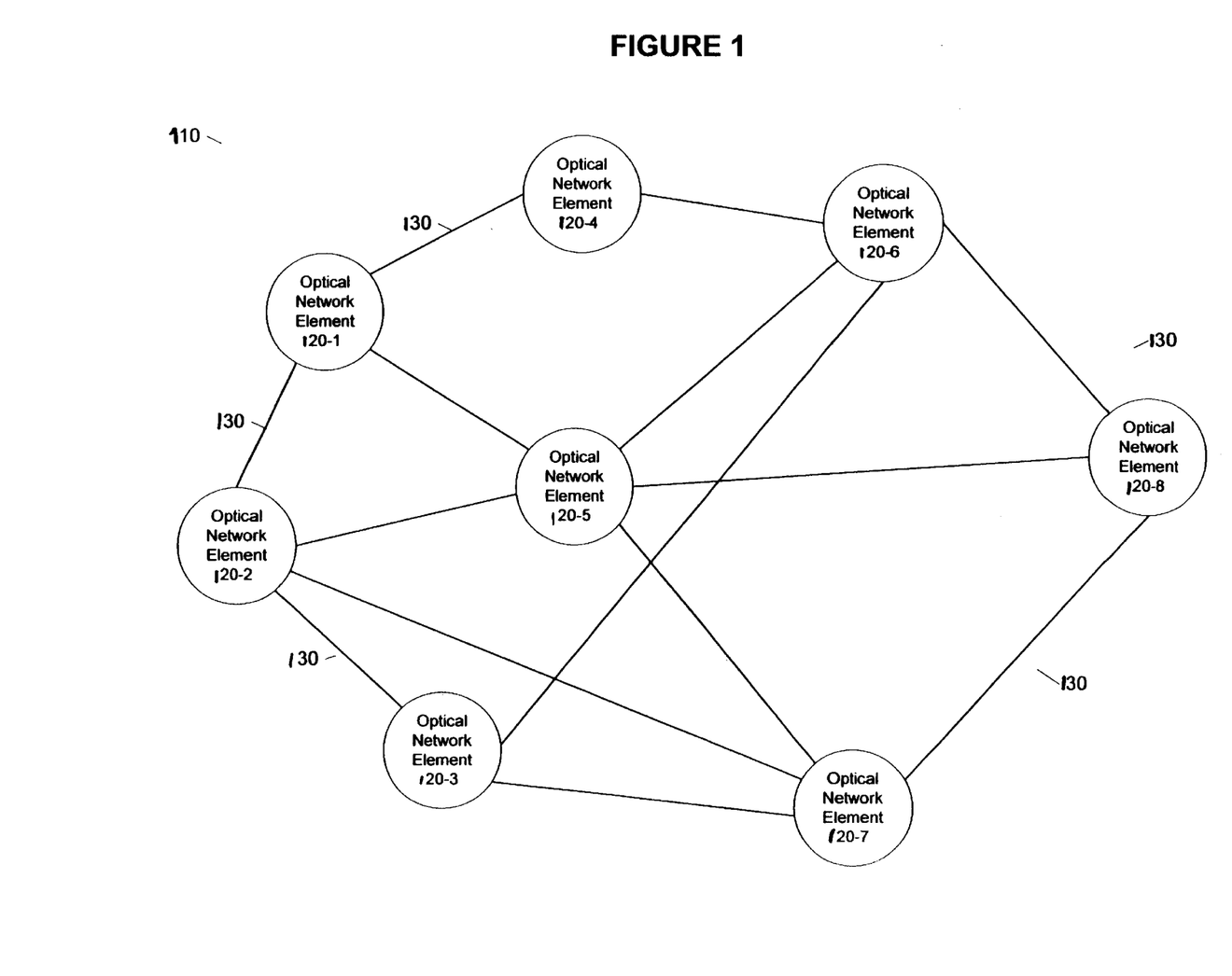
FIG. 1 is a block drawing of a generalized network in accordance with the present invention.

The present invention is particularly useful in optical switches for optical telecommunications network systems that carry optical communications signals, such as wavelength division multiplexed (WDM) signals, over optical fibers. FIG. 1 illustrates an exemplary embodiment of an optical mesh communications network 110. While FIG. 1 illustrates an optical mesh network, the present invention may be used in connection with other optical network architectures, such as ring, chains, and stars, among others, as well as other optical applications. As shown, the network 110 is made up of optical network elements 120-1 to 120-8 interconnected through optical links 130 in a mesh pattern. Of course, the number of optical network elements 120 and interconnections shown in FIG. 1 is intended as an example only. It should be clear that the present invention is applicable with different numbers and/or interconnections of network elements 120. The optical links 130 are shown generally and may encompass different numbers of optical paths and different physical paths between the network elements 120.

In general, the optical network elements 120 communicate information signals to other optical network elements through the optical links 130. The optical network elements 120 may include optical cross-connects, add-drop multiplexers, or other switching equipment to allow the signals carried on the optical links 130 to be transmitted through the network elements 120, as necessary, from source to destination. In addition, and not shown in FIG. 1, the optical network elements 120 may be connected to information sources (ingresses) and destinations (egresses) in the locality of that optical network element 120. Thus, information signals may enter the synchronous optical mesh network 110 at a local connection to network element 120-2. The information signals may be converted to optical signals, if they are not already, and then travel in the optical network 110 from network element 120-2, through network elements 120-3 and 120-7, and to network element 120-8, where it is passed to a destination in the locality of network element 120-8.

Figure 2:
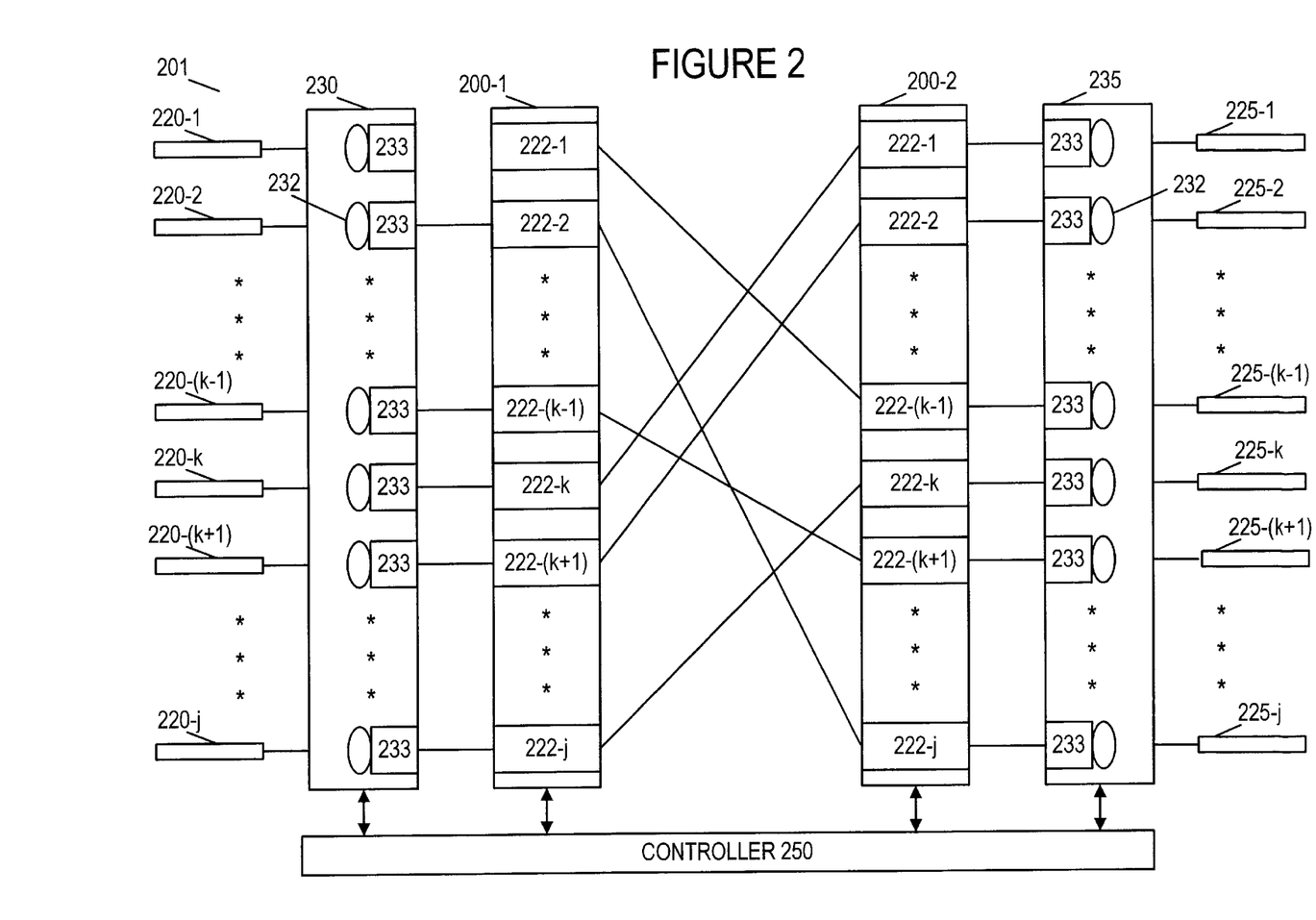
FIG. 2 is a block drawing of an optical switch in accordance with an exemplary embodiment of the present invention.

FIG. 2 illustrates a schematic of such an optical switch 201. The optical switch 201 according to the present invention may be configured as an optical cross connect (OXC), an add-drop multiplexer (ADM), or another optical switch arrangement, and may be used to switch optical signals at a network element 120 of FIG. 1.

The optical switch 201 switches optical signals from a plurality of input optical fibers 220-1 to 220-j (collectively "input optical fibers 220") to selected output fibers 225-1 to 225-j (collectively "output optical fibers 225"). The input optical fibers 220 and output optical fibers 225 may be arranged in any way, for example a k x j/k rectangular array, such as a square array. The present invention is not limited by the types of the optical signals carried by the input optical fibers 220 and output optical fibers 225. Each optical input fiber 220 may carry WDM signals, a single wavelength optical signal that was demultiplexed from a WDM signal by a wavelength division demultiplexer, or other types of optical signals. Similarly, each optical output fiber 225 may carry WDM signals, a single wavelength optical signal to be multiplexed with other optical signals by a wavelength division multiplexer, or other types of optical signals. The optical signals typically carry information and may have wavelengths of about 1300–1500 nm, for example. While FIG. 2 shows a schematic of an embodiment with j input optical fibers 220 and j output optical fibers 225, the number of input optical fibers may differ from the number of output optical fibers.

The input optical fibers 220 carry optical signals that are supplied, respectively, to a lens arrangement 230. The lens arrangement 230 may include a plurality of micro-lenses 232 arranged in an array. The micro-lenses 232 are preferably arranged so that each input optical fiber 220 is aligned with a micro-lens 232. Alternatively, microlenses 232 may be integrated with the ends of the input optical fibers 220. In this way, optical signals emitted from an input fiber 220 will pass through one of the micro-lenses 232. The micro-lenses 232 direct optical beams from the input optical fibers 220 to a first arrangement of micro-mirrors 200-1, which will be described in greater detail below. The lens arrangement 230 may also include optical detectors 233 that are aligned with the micro-lenses 232 on opposite sides of the substrates of the lens arrangements or have a fixed relationship therewith. The optical detectors 233 are capable of sensing optical signals as disclosed, for example, by U.S. patent application Ser. No. 09/691,193, filed Oct. 19, 2000, which is hereby incorporated by reference. Alternatively, optical detectors 233 may be provided separately or omitted.

The first micro-mirror arrangement 200-1 includes a plurality of steerable micro-mirrors 222. The micro-mirrors 222 may be arranged in a planar array or non-planar array. In a first embodiment, each input optical fiber 230 corresponds to one micro-lens 232 of the first lens arrangement 230 and one micro-mirror 222 of the first micro-mirror arrangement 200-1. Using the micro-mirrors 222 and responsive to control signals, the first micro-mirror arrangement 200-1 couples the optical beams from the lens array 230 to selected movable micro-mirrors 222 of a second arrangement of micro-mirrors 200-2. The second micro-mirror arrangement 200-2 includes micro-mirrors 222 that may be arranged on a planar or non-planar substrate. The second micro-mirror arrangement 200-2 need not match the first micro-mirror arrangement 200-1 in terms of being a planar array, a non-planar array, the number of mirrors, the shape of the mirrors or the size of the mirrors.

Each micro-mirror 222 of the first arrangement 200-1 is preferably movable to permit an input beam to be reflected by the micro-mirror 222 to any micro-mirror 222 of the second arrangement 200-2. The micro-mirrors 222 of the second arrangement 200-2, also responsive to control signals, receive and couple the optical beams through a second lens array 235 to output fibers 225. The second lens arrangement 235 includes micro-lenses 232, which may be arranged in an array, aligned with output optical fibers 225. Alternatively, microlenses 232 may be integrated with the ends of the input optical fibers 225. Micro-lenses 232 direct the optical beams into output optical fibers 225. Accordingly, optical signals carried on input optical fibers 220 may be selectively coupled to output optical fibers 225.

The micro-mirror arrangements 200-1 and 200-2 can be controlled to redirect or switch the coupling of optical signals. For example, as shown in FIG. 2, movable micro-mirror 222-1 of arrangement 200-1 directs an optical signal to movable micro-mirror 222-(k+1) of arrangement 200-2. However, responsive to control signals, movable micro-mirror 222-1 of arrangement 200-1 may redirect the optical signal it receives from input optical fiber 220-1 to movable micro-mirror 222-2 of arrangement 200-2. Micro-mirror 222-2 may be controlled to receive the optical signal and provide it to optical fiber 225-2.

While FIG. 2 shows a one stage switching arrangement, one or more additional stages of micro-mirror arrangements may be interposed between micro-mirror arrangements 200-1 and 200-2 to form a multi-stage switching arrangement. Furthermore, a micro-mirror arrangement may contain three mirror arrangements in which the first micromirror arrangement can direct the input beam to two or more other micro-mirror arrangements near output fibers. That is, micro-mirror arrangement 202-2 may be replaced with two or more different micro-mirror arrangements. Of course, such an arrangement is more readily accomplished with the two or more micro-mirror arrangements being angled with respect to each other so that each one is disposed facing the first micro-mirror arrangement 200-1.

Figure 3:
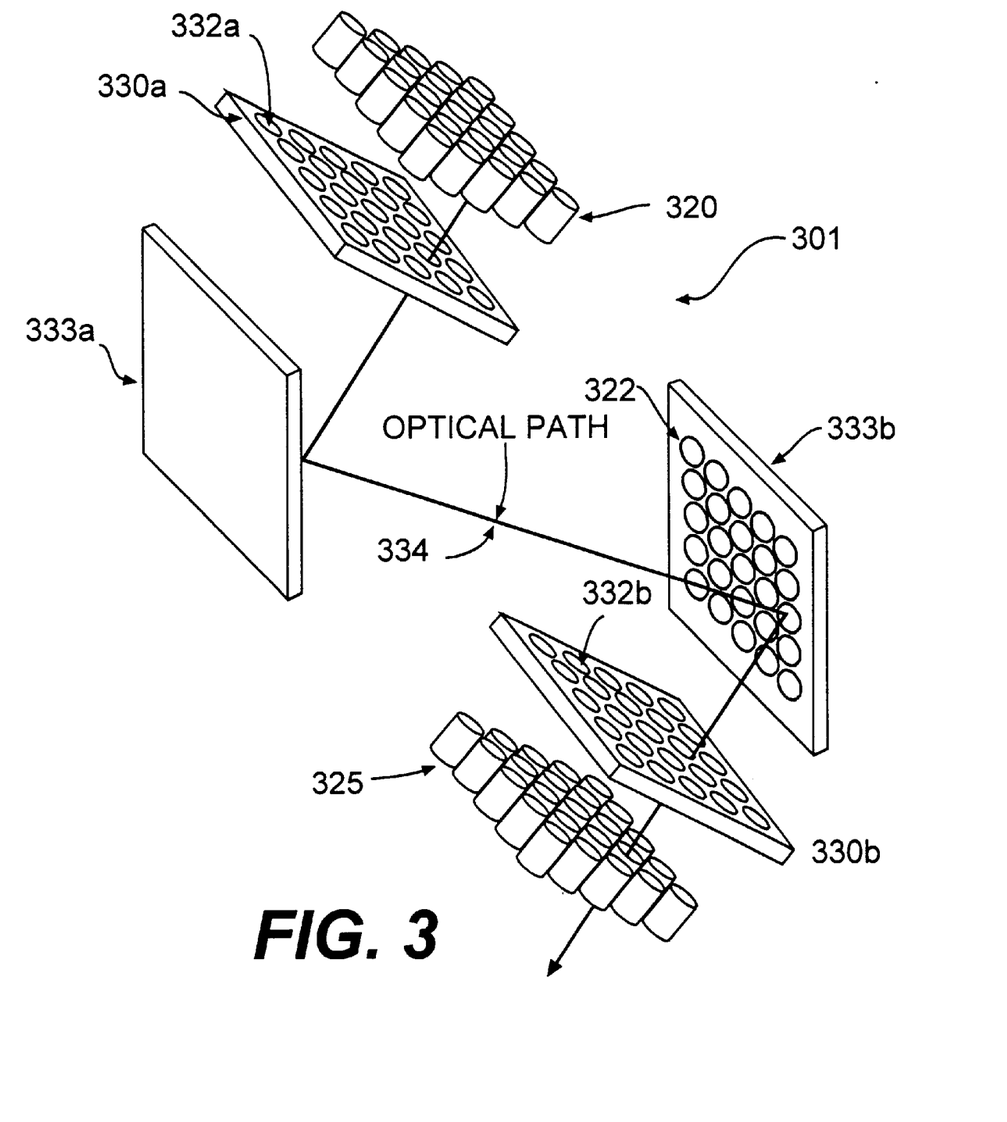
FIG. 3 is a perspective schematic drawing of an exemplary optical switch in accordance with an embodiment of the present invention.

FIG. 3 shows an example of an embodiment of an optical switch 301 according to the schematic of FIG. 2. As shown in FIG. 3, the input optical fibers 320 and the output optical fibers 325 are arranged in two-dimensional arrays. Similarly, lens arrangements 330a and 330b include micro-lenses 332a, 332b arranged in arrays and aligned with the input optical fibers 320 and the output optical fibers 325, respectively. The micro-mirrors 322 of the first and second arrangements 333a, 333b may be formed by microelectromechanical system (MEMS) elements arranged in an array. The first MEMS arrangement 333a is positioned at an angle to lens array 330 and generally faces the second MEMS arrangement 333b with some offset. The second MEMS array 333b is positioned at an angle to the second lens array 330b. Accordingly, an optical path 334 from the input fiber 320 to an output fiber 325 traverses a generally "Z" shaped path, as illustrated in FIG. 3.

As shown in FIG. 3 with a single optical beam, the first lens array 330a receives the input optical beam from the input optical fibers 320 at a micro-lens 332a and directs the input beam to a movable micro-mirror 322 of the first MEMS arrangement 333a. Depending on the angular position of the movable micro-mirror 322, the input optical beam is reflected to a selected movable micro-mirror 322 of the second MEMS arrangement 333b. The movable micromirror 322 of the second MEMS arrangement 333b reflects the input optical beam through a lens 332b of the second lens array 330b to a selected one of the output optical fibers 325. Thus, the optical beam passes out of the input optical fiber 320, passes through a lens 332a of the first lens array 330a, is reflected by the first and second MEMS arrangements 333a, 333b, passes through a lens 332b of the second lens array 330b, and is directed into a selected output optical fiber 325. Preferably, each of the input optical fibers 320 is coupled to a corresponding one of the micromirrors 322 of the first MEMS arrangement 333a. Similarly, each of the output optical fibers 325 is coupled to a corresponding one of the micromirrors 322 of the second MEMS arrangement 333b. This arrangement efficiently utilizes the optical throughput in view of the small numerical aperture of the optical fibers 320, 325.

Each micromirror 322 of the first MEMS arrangement 333a is positioned to direct optical signals from its corresponding input optical fiber 320 to the selected micromirror 322 of the second MEMS arrangement 333b corresponding to the desired output optical fiber 325. Similarly, each micromirror 322 of the second MEMS arrangement 333a is positioned to receive optical signals from the desired micromirror 322 of the first MEMS arrangement 333b and direct the optical signal to its corresponding output optical fiber 325. While the foregoing optical switch 301 has been discussed with only one direction of transmission, the optical switch can be operated in the opposite direction or bi-directionally.

For any particular optical path 334 of FIG. 3, the optical loss includes the result of the Guassian beam divergence and possibly clipping of the beam due to the finite size of the corresponding micromirrors 332. Thus, optical losses increase with increased angle of the MEMS arrays 333a, 333b with respect to the incident angle. That is, the effective area of a micromirror 332 scales with the cosine of the angle of incidence. In addition, optical losses increase with increased path length due to reasons such as the beam divergence. However, a sufficiently large path length may be needed so that each micromirror of one MEMS array can be optically coupled with a micromirror of the other MEMS array because the micromirrors may have a limited deflection angle, such as ±6 degrees for example. Also, since the components such as the fiber arrays and lens arrays have discrete sizes, a decreased angle of incidence would require a longer path length or else some of the optical signals would be blocked by the optical components, thereby causing a shadowing effect. Thus, the angle of incidence must be sufficiently large to provide sufficient clearance around the "footprint" of the components.

Figure 4:
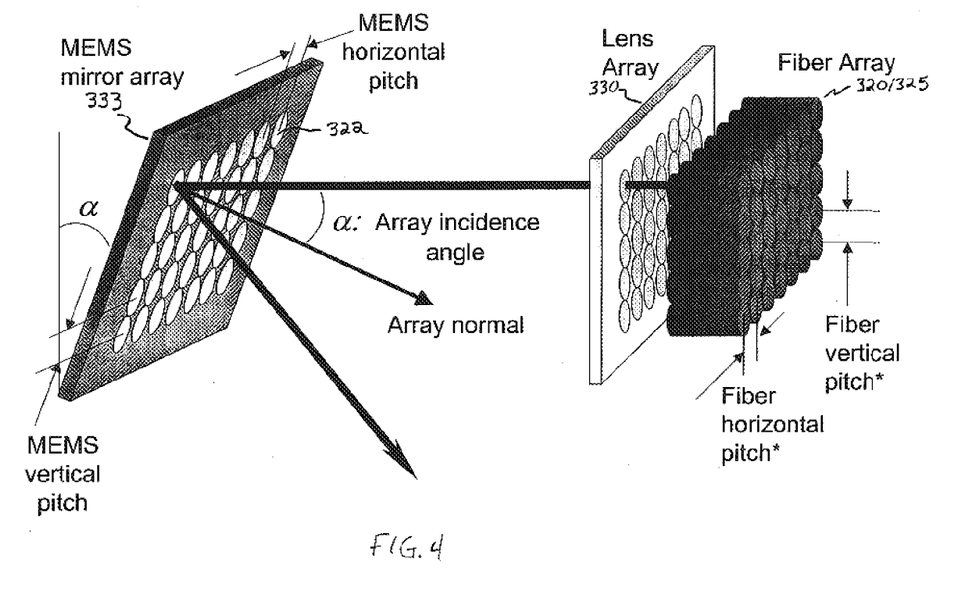
FIG. 4 is a perspective schematic drawing illustrating the coupling of a MEMS array with a fiber array.

FIG. 4 shows a MEMS array 333 coupled with a fiber array 320/325 via a lens array 330. As shown in FIG. 4, the array incidence angle is designated as $\alpha$. Here, the array incidence angle is measured with respect to the plane defined by the overall array of micromirrors 322. It should be recognized that the incidence angle onto an individual micromirror also involves the tilt angle of the micromirror. The horizontal pitch of the micromirrors of the MEMS array 333 is generally the same as the horizontal pitch of the fibers of the fiber array 320/325. Also, the vertical pitch of the micromirrors of the MEMS array 333 is generally equal to the vertical pitch of the fibers of the fiber array 320/325 divided by $\cos(\alpha)$. While the fiber array 320/325 can have any suitable configuration, a fiber array 320/325 may be a rectangular fiber array, for example, having a 1 mm pitch in both the vertical and horizontal array. Of course other configurations can be used in accordance with the present invention.

In the foregoing exemplary configuration of FIG. 4, the components are disposed substantially in a vertical plane. However, non-coplanar configurations may be implemented to provide, for example, a "twisted" crossconnect.

Figure 5:
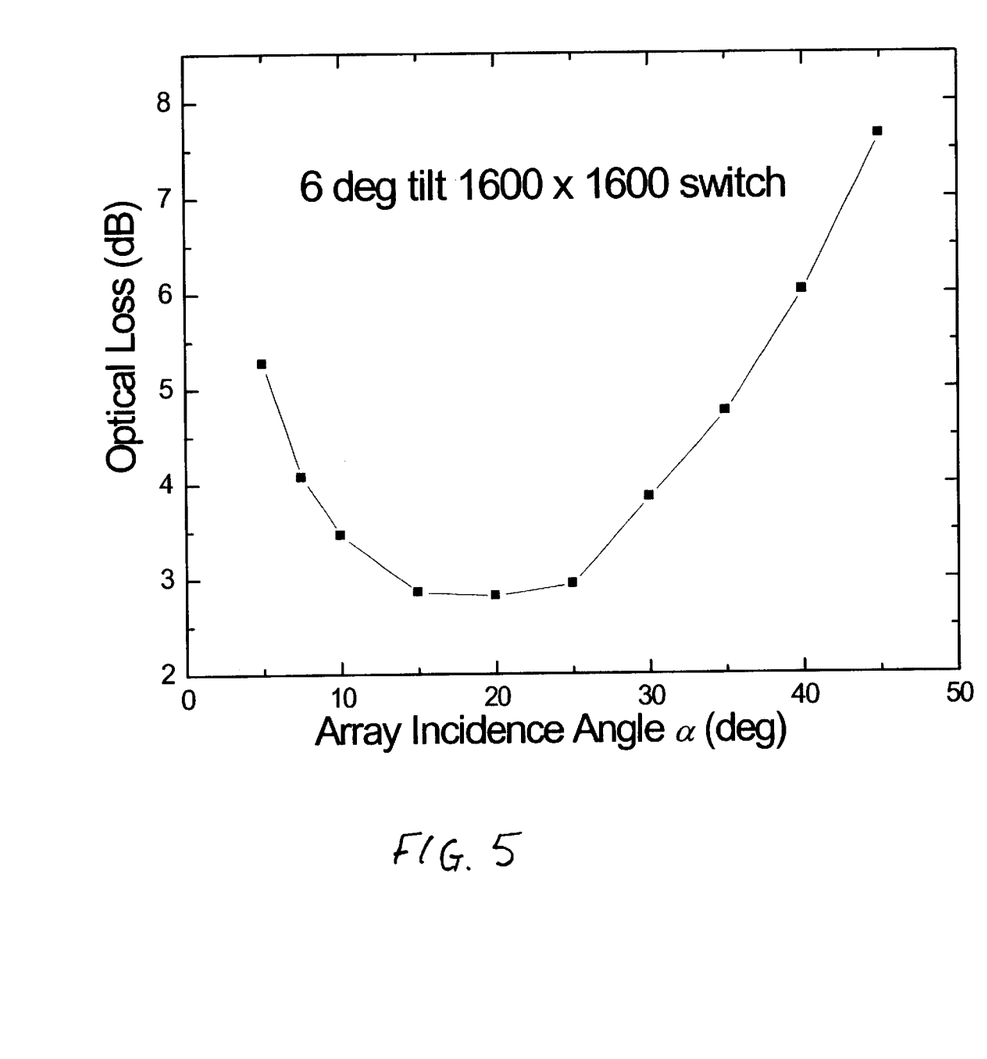
FIG. 5 is a plot of the optical loss versus the array incidence angle for an exemplary optical switch in accordance with an embodiment of the present invention.
Figure 6:
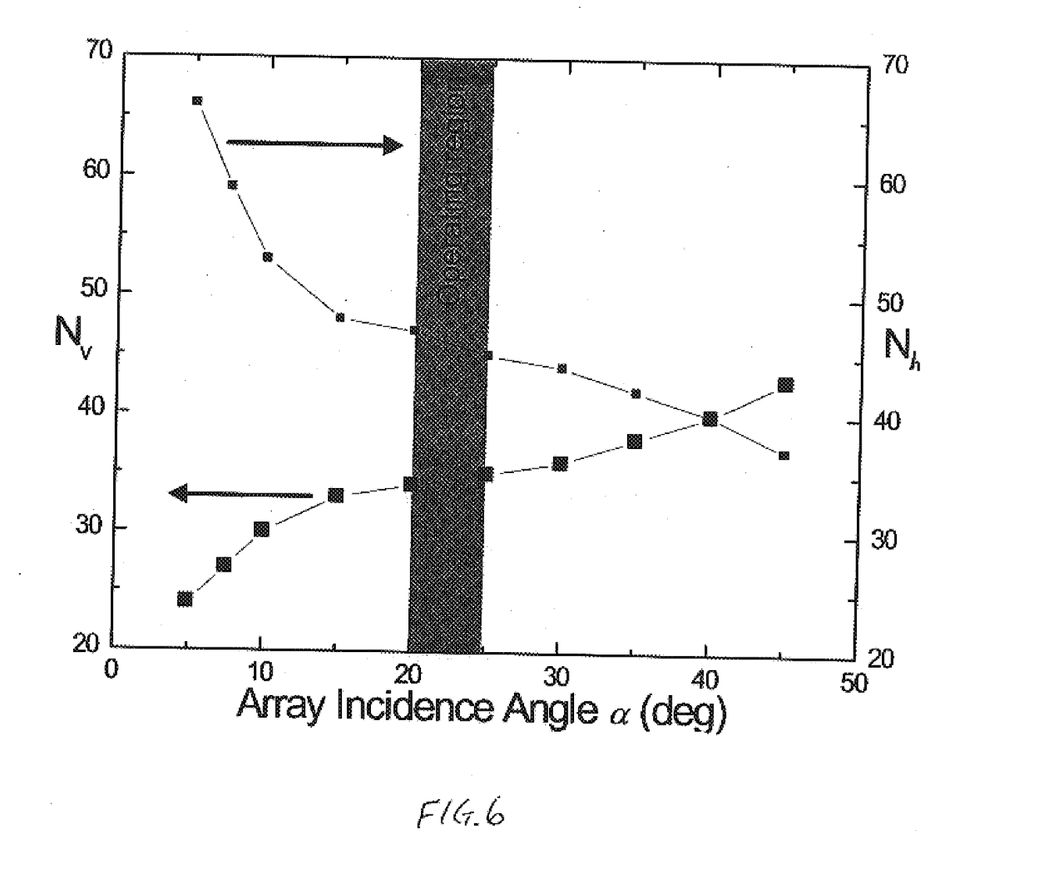
FIG. 6 is a plot of the dependence of the number of vertical rows and the number of horizontal columns as a function of array incidence angle to reduce optical losses for an exemplary optical switch in accordance with an embodiment of the present invention.

The preferred embodiment of the present invention considers the incident angle, the path length, and the footprints of the components to improve optical through-put. FIG. 5 shows a plot of optical loss versus array incident angle using the minimum optical path such that each micromirror combination can be achieved. FIG. 6 shows a plot of the aspect ratio of the MEMS array versus array incident angle. In the exemplary configuration corresponding to FIGS. 5 and 6, an analysis for a 1600×1600 switch (i.e., 1600 input fibers and 1600 output fibers) using a 1 mm×1.07 mm pitch MEMS array and a 1 mm×1 mm pitch fiber array is considered. The MEMS array employed 800 micron diameter micromirrors. Here, $N_v$ and $N_h$ are determined as a function of array incidence angle to provide reduced path length and, therefore, reduced optical losses. However, for each data point in FIG. 6, the product of $N_v$ and $N_h$ is always 1600 or greater so that 1600 input fibers and 1600 output fibers can be accommodated in a 1600×1600 switch. In FIG. 5, it is presumed that the light received by each respective micromirror fills or slightly overfills the micromirror. For each incident angle, the number of vertical rows ($N_v$) and the number of horizontal columns ($N_h$) are varied—with the product thereof being approximately constant and greater or equal to the number of ports—to produce the shortest optical path length for a specified maximum tilt angle of the micromirrors of the MEMS array.

As discussed above, to determine the shortest optical path, one must determine the shortest optical path such that each micromirror of each MEMS array can be coupled with every micromirror of the other MEMS array. The shortest path is chosen such that each light beam from a fiber within a lens-fiber array can be coupled to any fiber within the other lens-fiber array (after reflection by the micromirrors of the MEMS arrays) with the following limitations: (1) each mirror's tilt does not exceed its maximum tilt angle (e.g., about 6 degrees); and (2) each of the fiber-lens arrays does not get too close to its corresponding MEMS array such that the fiber array begins to clip the reflected beams from the MEMS array. When determining the optical loss for the particular arrangement, the optical path length—and thus the optical loss—will depend on which two fibers (or their corresponding micromirrors) of the respective fiber for MEMS arrays are selected. As a result, the location of the two input and output fibers that define the longest possible path length are used to determine the optical loss. As shown, the array incidence angle should be greater than about 10 degrees and less than 30 degrees to achieve low optical loss. To achieve reduced optical losses, the array incidence angle should be greater than 15 degrees. Similarly, an angle of less than 25 degrees can achieve reduced optical losses. Since FIG. 5 does not take into account the footprint of the fiber array and the lens array, an array incidence angle should provide sufficient physical clearance for the footprint of the fiber-lens array. In the exemplary configuration of FIGS. 5 and 6, the array incidence angle should be greater than about 20 degrees. Here, it is presumed that the MEMS array does not extend significantly beyond the micromirrors. In this situation, the most preferred array incidence angle is between 20 and 25 degrees.

In determining the configuration with reduced optical losses, the fiber array and/or MEMS array need not be square array. For example, the number of vertical rows ($N_v$) may be different than the number of horizontal columns ($N_h$). As shown in FIG. 6, $N_v$ is less than $N_h$ in most of the potential operating region. In the highlighted preferred operating region, $N_v$ is about 1.25 to 1.45 times less than $N_h$.

While the results presented with reference to FIGS. 5 and 6 related to the exemplary configuration as described, it can be recognized that the array incidence angle results may not significantly vary if certain parameters of the configuration are changed. For example, if the tilt angle capabilities of the micromirrors in the MEMS array are increased, the optical path between the two MEMS arrays can be decreased because the increased deflection permits micromirrors of one MEMS array to couple with any one of the micromirrors of the other MEMS array with the MEMS arrays closer together. In this situation, greater reduction in optical losses may be achieved by shortening the optical path length than by varying the array incidence angle. Moreover, the array incidence angle for reduced total optical loss with the shortened path length will not change greatly. Moreover, if the aspect ratio of the MEMS array is changed, the optical path length for reduced the optical loss will change but the array incidence angle will not change greatly.

Figure 7:
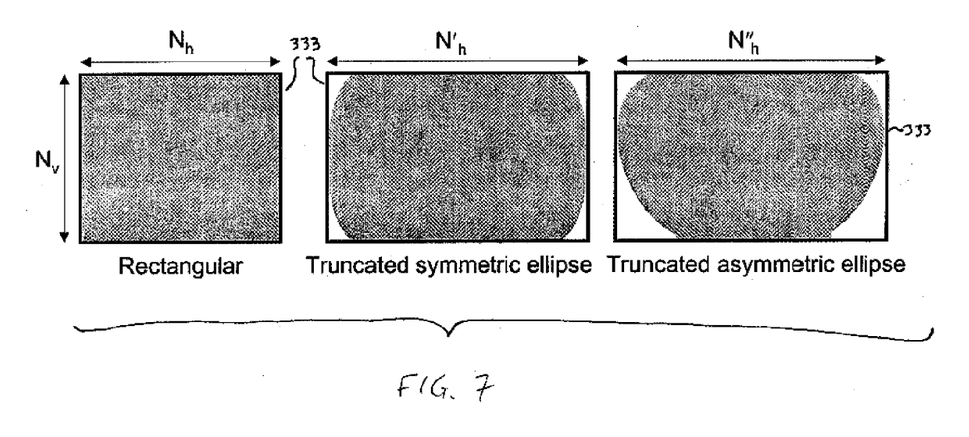
FIG. 7 is a schematic drawing comparing rectangular array configurations with truncated elliptical array configurations in an optical switch in accordance with the present invention.

In yet another configuration, the fiber array and the MEMS array may be formed in shapes other than rectangular. The restriction of the maximum tilt angle from a micromirror defines a conical outline for the achievable reflected beam directions. Thus, to achieve reduced path length for a particular array incidence angle, the fiber array and a portion of the MEMS array to be used can be provided in an elliptical configuration or a truncated elliptical configuration. Here, the truncated elliptical configuration has two opposite sides defined by an ellipse and two other opposite side that are straight (i.e., truncated). Rather than using the truncated elliptical configuration to reduce path length, the same path length can be achieve with 25% more ports with a truncated symmetric elliptical array as compared to a rectangular array as shown in FIG. 7.

Rather than using the truncated elliptical configuration to reduce path length or increase port numbers, the truncated symmetric elliptical array can be implemented to achieve reduced tilt angle requirements of the micromirrors in a configuration with the same path length and port number. As further shown in FIG. 7, since the MEMS array is disposed at an angle with respect to the fiber array, a truncated asymmetric elliptical array can be used to achieve reduced path length, increase port numbers, or reduced tilt angle requirements. For example, the asymmetric elliptical array can achieve 2% more ports than the truncated symmetric elliptical array. However, in view of the relatively small improvement, the truncated symmetric elliptical configuration may be desired to reduce unused MEMS cells, thereby increasing packing efficiency.

Figure 8:
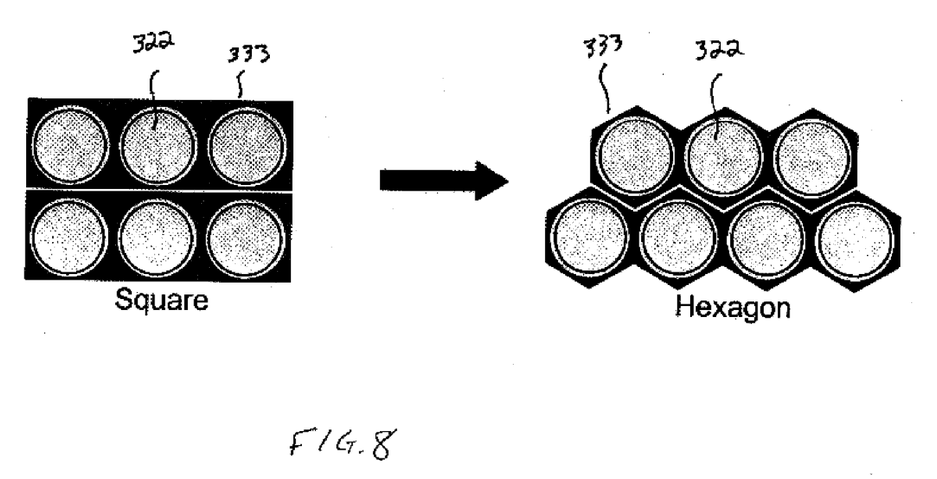
FIGS. 8 and 9 are schematic drawings illustrating the use of a hexagonal packing configuration in an optical switch in accordance with the present invention.
Figure 9:
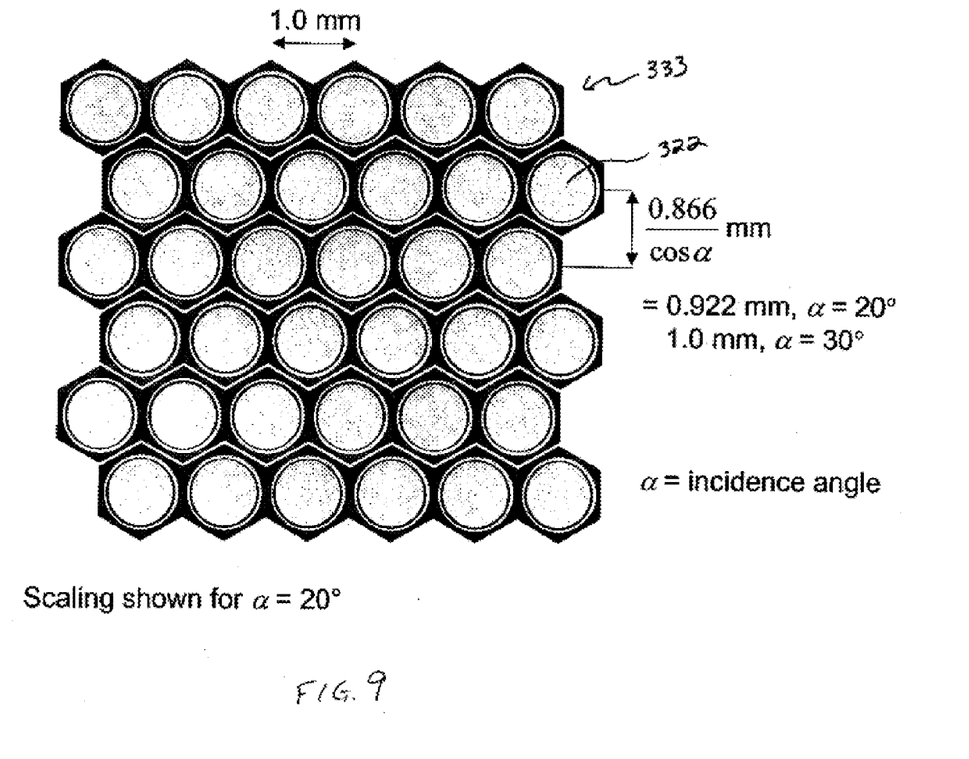

In yet another alternative configuration, the square packing of the MEMS array described above can be replaced with a hexagonal packing as shown in FIGS. 8 and 9. Here, the micromirror cells 322 of every other row are shifted half a cell so that the rows can be packed more tightly. As a result, each micromirror cell has six substantially equally adjacent neighboring micromirror cells. In the exemplary FIG. 9, if the fiber array has a horizontal pitch of 1.0 mm, a vertical pitch of 0.866 mm can be achieved. Further, the vertical pitch of the MEMS array will be $0.866/\cos(\alpha)$. Accordingly, the hexagonal packing allows about an 18% increase in the packing density. As a result, the hexagonal packing configuration allows shorter path lengths (i.e., reduced optical loss), increased port numbers, and/or reduced micromirror tilt angle requirements. Of course, the hexagonal packing can be used in an overall rectangular array, a truncated elliptical array, or other suitable configuration in accordance with the particular application. In a square/rectangular packing configuration, one must be consider the vertical distance between micromirror rows to prevent the light (which may overfill a micromirror or which may not be precisely aligned with the mirror) from impinging on a neighboring micromirror, thereby causing crosstalk. In the hexagonal packing configuration, one must consider the diagonal distance to the nearest neighboring micromirrors.

Figure 10A:
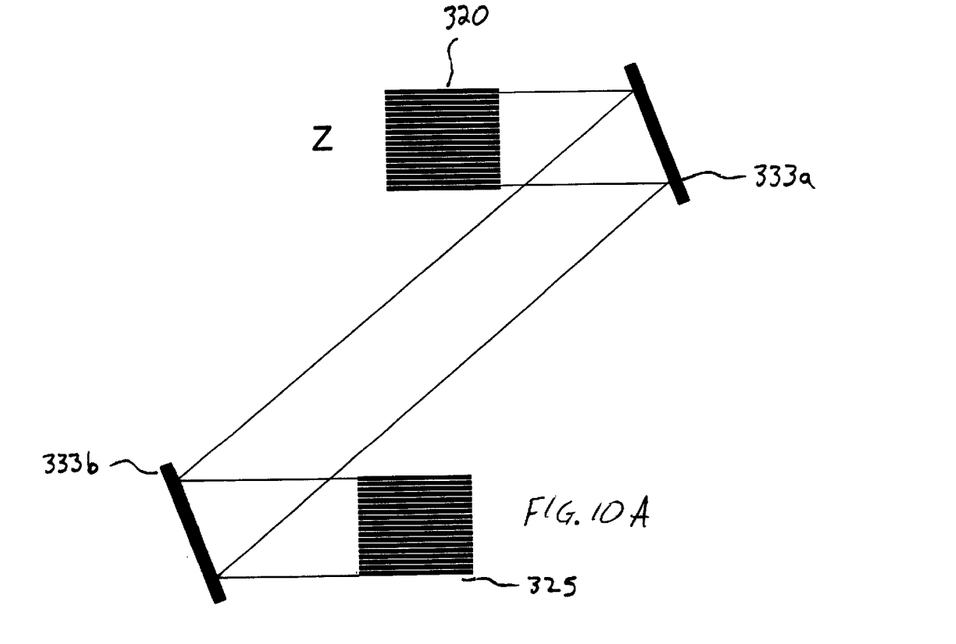
FIGS. 10A–10C are schematic drawings illustrating various configurations of optical switches in accordance with the present invention.
Figure 10B:
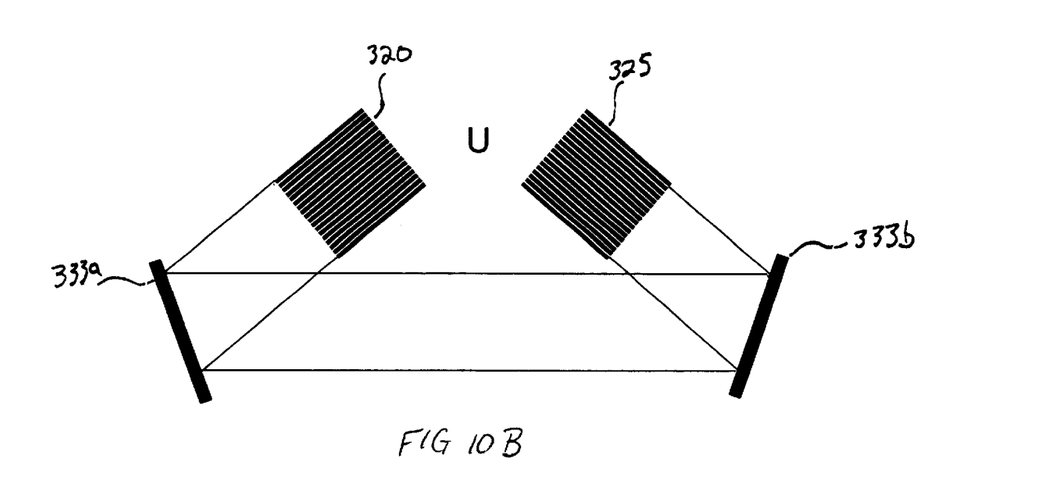
Figure 10C:
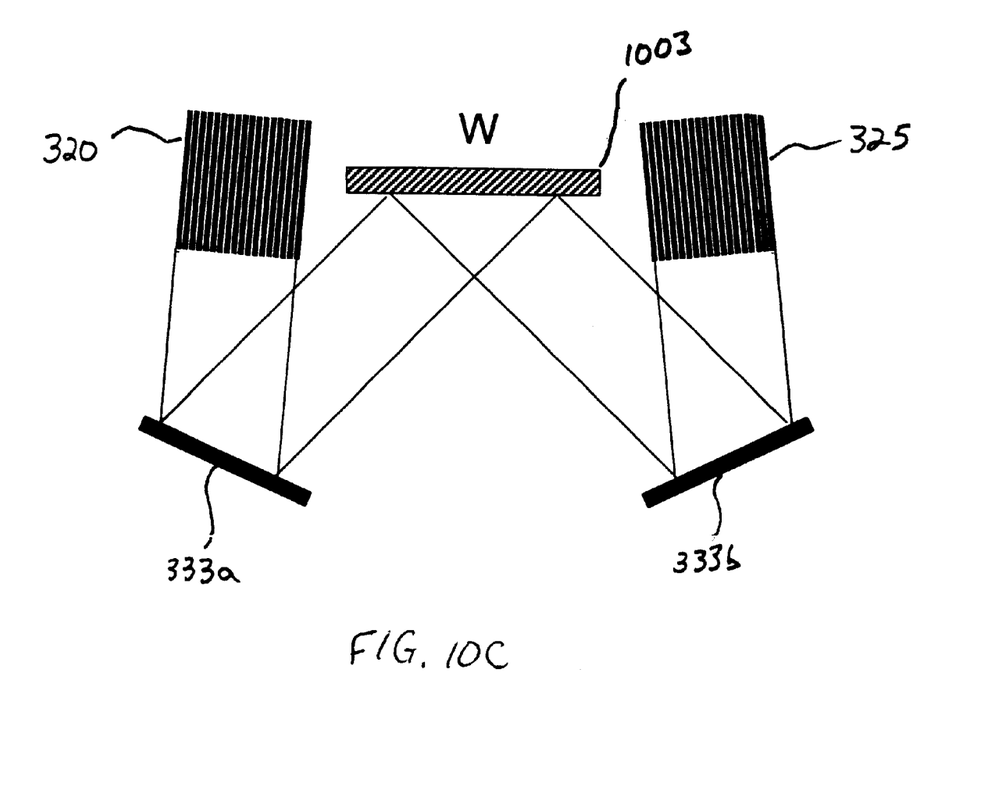

While the invention has been presented in a Z-configuration as shown in FIG. 10A, U-configurations (FIG. 10B), W-configuration (FIG. 10C), or other suitable configurations may be implemented in accordance with the specific application. The W-configuration is topologically the same as the Z-configuration except that a mirror 1003 is used to fold back the optical path. The Z- and W-configurations are generally advantageous as compared to the U-configuration because the shortest and longest path lengths are relatively similar. As a result, the optical loss for different channels will be more similar. This simplifies power budget issues for the interfaces (i.e.,detectors, transmission lasers, etc.). Also, the Z-configuration provides the simplest packaging.

Figure 11A:
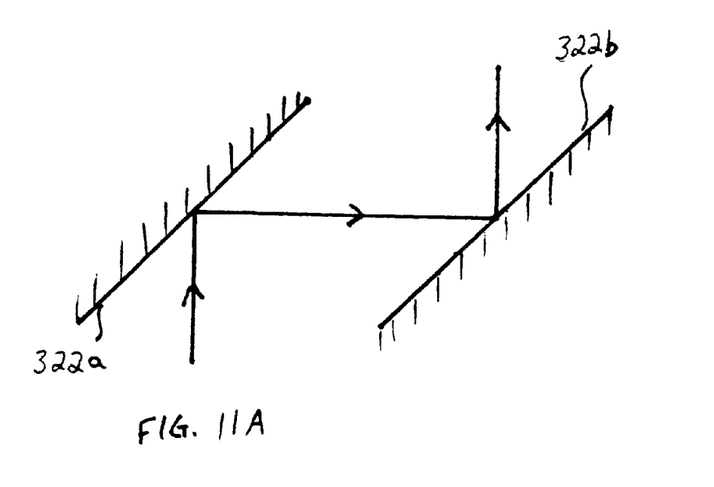
FIGS. 11A and 11B are schematic drawings respectively showing the effects of angular deflections on micromirrors of exemplary optical switches of a two reflection configuration.

Preferably, the optical path has an even number (preferably two) reflections. Such an arrangement provides immunity to an angular acceleration such as a shock or vibration. FIG. 11A shows an exemplary micromirror combination having a Z-configuration with parallel micromirrors 322a, 322b. Under ideal conditions, any configurations can properly direct optical signals as shown, for example, in FIG. 11A. However, as will be shown with reference to FIG.

Figure 11B:
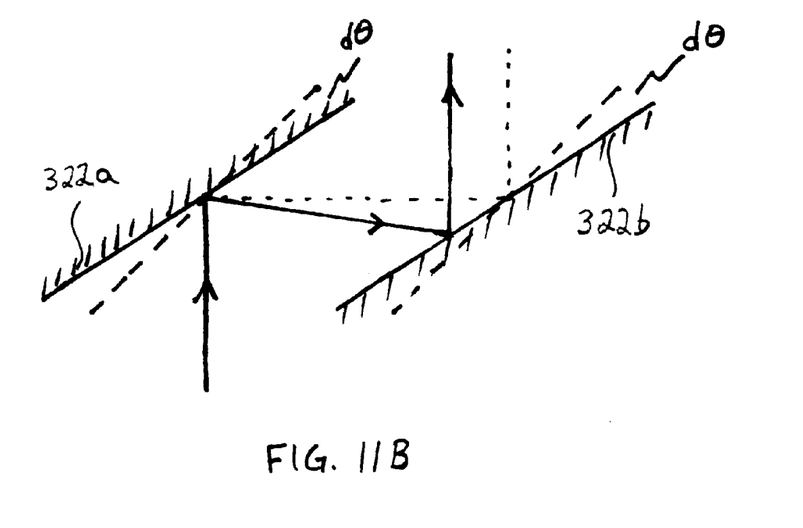

11B, the two reflection configuration provides improved vibrational immunity.

If a shock or other vibration occurs, a certain component may impart an angular acceleration to the optical switch. Accordingly, both micromirrors 322a, 322b of the respective MEMS arrangements will be deflected dθ. The deflection errors in the parallel arrangement of FIG. 11B substantially cancel. While a small lateral shift occurs in the case of FIG. 11B, the lateral shift will be small if dθ is small and angular alignment is maintained. Moreover, optical losses due to small lateral displacements are much smaller than losses due to angular deviation. Thus, the two reflection configuration minimizes beam misalignment.

It will be apparent to those skilled in the art that various modifications and variations can be made in the optical switch of the present invention without departing from the spirit or scope of the invention. Thus, it is intended that the present invention cover the modifications and variations of this invention provided they come within the scope of the appended claims and their equivalents.

What is claimed is:

1. An optical switch comprising:
   a plurality of first optical fibers;
   a plurality of second optical fibers;
   a first MEMS array optical coupled with the first optical fibers to receive optical signals from the first optical fibers and to direct the optical signals, the first MEMS array defining a first array incidence angle between a normal direction to the first MEMS array and a direction of the received optical signals;
   a second MEMS array optical coupled with the first MEMS array to receive the directed optical signals and to re-direct the directed optical signals for insertion into the second optical fibers, the second MEMS array defining a second array incidence angle between a normal direction to second MEMS array and a direction of the re-directed optical signals;
   wherein the first MEMS array include a plurality of rows of MEMS cells and the MEMS cells in adjacent rows are offset by approximately one half cell.

2. The optical switch according to claim 1, wherein the first and second array incidence angles are each defined between 15 and 25 degrees.

3. The optical switch according to claim 1, wherein the first and second array incidence angles.are each defined between 20 and 25 degrees.

4. The optical switch according to claim 1, wherein the first and second array incidence angles are selected in conjunction with optical path length to reduce optical loss.

5. The optical switch according to claim 1, wherein the optical path between the first optical fiber and the second optical fiber is substantially a plane.

6. The optical switch according to claim 1, wherein the first optical fibers, the second optical fibers, the first MEMS array, and the second MEMS array are non-coplanar and define a twisted optical path.

7. An optical switch comprising:
   a plurality of first optical fibers;
   a plurality of second optical fibers;
   a substantially rectangular first MEMS array optically coupled with the first optical fibers to receive optical signals from the first optical fibers and to direct the optical signals, the first MEMS array defining a first array incidence angle between a normal direction to the first MEMS array and a direction of the received optical signals;
   a second MEMS array optically coupled with the first MEMS array to receive directed optical signals and to re-direct the directed optical signals for insertion into the second optical fibers, the second MEMS array defining a second array incidence angle between a normal direction to second MEMS array and a direction of the re-directed optical signals,
   wherein the first and second array incidence angles are each defined between 10 and 30 degrees and the rectangular first MEMS array is defined by a first number of MEMS cells in a first direction and a second number of MEMS cells in a second direction, a ratio of the first number to the second number being between 1.25 and 1.45.

8. The optical switch according to claim 7, wherein the first and second array incidence angles are each defined between 15 and 25 degrees.

9. The optical switch according to claim 7, wherein the first and second array incidence angles are each defined between 20 and 25 degrees.

10. The optical switch according to claim 7, wherein the first and second array incidence angles are selected in conjunction with optical path length to reduce optical loss.

11. The optical switch according to claim 7, wherein the optical path between the first optical fiber and the second optical fiber is substantially a plane.

12. The optical switch according to claim 7, wherein the first optical fibers, the second optical fibers, the first MEMS array, and the second MEMS array are non-coplanar and define a twisted optical path.

* * * * *